US010097429B2

(12) United States Patent
Bezold et al.

(10) Patent No.: US 10,097,429 B2
(45) Date of Patent: Oct. 9, 2018

(54) SYSTEM AND METHOD FOR APPLYING AGGREGATED CABLE TEST RESULT DATA (71) Applicant: Fluke Corporation, Everett, WA (US)

(72) Inventors: David E. Bezold, Mukilteo, WA (US); J. David Schell, Austin, TX (US); Steve O'Hara, Poulsbo, WA (US)

(73) Assignee: Fluke Corporation, Everett, WA (US)

( * ) Notice: Subject to any disclaimer, the term of this patent is extended or adjusted under 35 U.S.C. 154(b) by 378 days.

(21) Appl. No.: 14/951,587

(22) Filed: Nov. 25, 2015

(65) Prior Publication Data
US 2017/0149634 A1    May 25, 2017

(51) Int. Cl.
G06F 15/16    (2006.01)
H04L 12/26    (2006.01)
G06F 11/22    (2006.01)

(52) U.S. Cl.
CPC .......... H04L 43/045 (2013.01); G06F 11/221 (2013.01); G06F 11/2294 (2013.01); H04L 43/50 (2013.01)

(58) Field of Classification Search
CPC ...................................... H04L 43/50
USPC ......................................... 709/224
See application file for complete search history.

(56) References Cited

U.S. PATENT DOCUMENTS 5,745,384 A * 4/1998 Lanzerotti ............ G01D 3/032
                                                324/323
6,385,552 B1 * 5/2002 Snyder ................ H04B 10/079
                                                398/9
8,488,472 B2 * 7/2013 Morris .................... H04L 41/12
                                                370/240
9,400,301 B2 * 7/2016 Kanne ................... G01R 31/021
2006/0004814 A1 * 1/2006 Lawrence .............. G06Q 40/08
2006/0004866 A1 * 1/2006 Lawrence .......... G06F 17/30011
2007/0195711 A1 * 8/2007 Morris ................... H04L 41/082
                                                370/254
2011/0218790 A1 * 9/2011 Algaonkar ............. G01K 11/32
                                                703/13
2013/0051247 A1 * 2/2013 Reese ..................... H04L 43/08
                                                370/242

(Continued)

FOREIGN PATENT DOCUMENTS

WO    2015/116091 A1    8/2015

OTHER PUBLICATIONS

Extended European Search Reported for Application No. EP 16 20 0555 dated May 9, 2017.

*Primary Examiner* — Hamza N Algibhah
(74) *Attorney, Agent, or Firm* — Seed IP Law Group LLP (57) ABSTRACT A system and method for aggregation of test result data includes a plurality of first testing devices configured to perform testing procedures to test cables of at least one communication network and to output associated first test result data. A cloud-based server device is coupled via a network to the plurality of first testing devices. The server device includes a database configured to store the first test result data and a processor. The processor is configured to determine a statistic associated with an aggregation of the first test result data output by the plurality of first testing devices. Second test result data is then received by the processor from a second testing device so as to be compared to the determined statistic and to output an indication of a result of the comparison.

21 Claims, 7 Drawing Sheets (56) References Cited

U.S. PATENT DOCUMENTS

2016/0134508 A1* 5/2016 Maness ............... H04L 43/50
709/224
2018/0034819 A1* 2/2018 Yan .................. H04L 63/10

* cited by examiner

SYSTEM AND METHOD FOR APPLYING AGGREGATED CABLE TEST RESULT DATA

FIELD OF THE INVENTION

The disclosed embodiments generally relates to a system and method for testing cables of a communication network, and more particularly, to a system and method for cloud-based aggregation of cable test result data associated with testing communication cables of a communication network.

BACKGROUND OF THE INVENTION

Testing devices are configured to perform cabling diagnostics, verification, certification, and/or qualification of at least one communication network and to output test result data associated with performance of respective cable testing procedures. Each testing device can store test result data and associated test result data. The stored test result data can be manually uploaded to a local computer. The local computer may receive test result data from testing devices that are located in its vicinity, however the local computer does not have access to test result data generated by testing devices that are remote.

When a communication network is setup, a service provider responsible for the communication network performs cabling verification to establish proper performance of the network. The verification procedure requires testing each cable link and/or cable to verify that the cable and links are operating properly. The verification procedures are time consuming, and the testing devices used for performing these verification procedures are expensive. As the verification procedure is a costly one, service providers are ever interested in increasing efficiency of the verification process. At the same time, operators are sometimes interested in taking short cuts by submitting false data, using methods they have devised to reuse data, perform tests on a single cable under the pretense that multiple cables were tested, and misrepresenting data included in reports. Efficiency analysis and data authentication can be limited by access to local data.

Additionally, there are environmental factors that can negatively or positively affect operation of the communication network. However, since verification data is processed at local computers, the computers are limited to accessing local data. The limited access to local data impairs the ability to understand the effect of environmental data on operation of communication networks in different locations.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for aggregation of test result data is described. Provided is a plurality of first testing devices configured to perform testing procedures to test cables of at least one communication network and to output associated first test result data. A cloud-based server device is further provided which is coupled via a network to the plurality of first testing devices. The server device includes a database configured to store the first test result data and a processor.

The processor is configured to determine a statistic associated with an aggregation of the first test result data output by the plurality of first testing devices. Second test result data is then received by the processor from a second testing device so as to be compared to the determined statistic so as to output an indication of a result of the comparison.

In accordance with another aspect, a cloud-based computer server is provided. The cloud based server includes a memory configured to store instructions, and a processor configured to receive first test result data output by a plurality of first testing devices and associated with testing procedures performed by the plurality of first testing devices to test cables of at least one communication network. The processor is further configured to determine a statistic associated with an aggregation of the first test result data output by the plurality of first testing devices, receive second test result data from a second testing device, compare the second test result data to the statistic, and output an indication of a result of the comparison.

In accordance with a further aspect, a method of aggregating test result data is provided. The method includes determining a statistic associated with an aggregation of the first test result data output by the plurality of first testing devices, receiving second test result data from a second testing device, comparing the second test result data to the statistic, and outputting an indication of a result of the comparison.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithms or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 1:
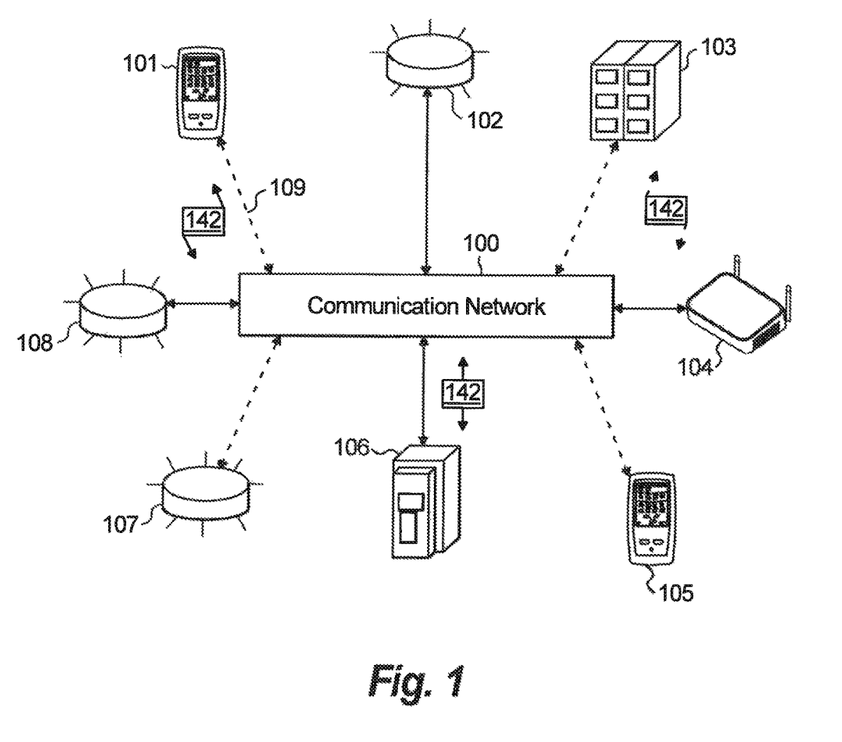
FIG. 1 illustrates an example communication network.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
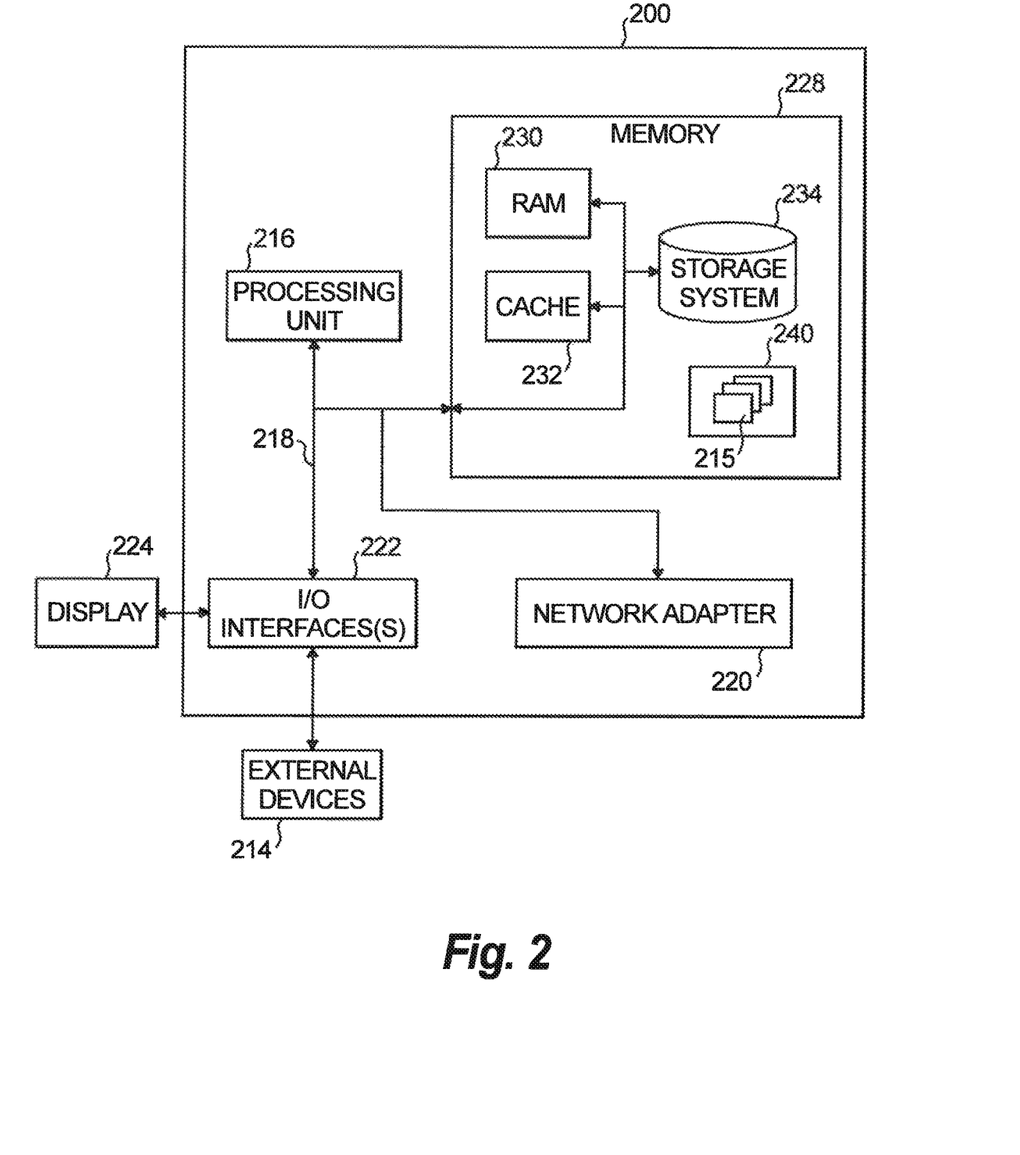
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

In the description that follows, certain embodiments may be described with reference to acts and symbolic representations of operations that are performed by one or more computing devices, such as the computing system environment 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided.

With reference now to FIGS. 3-7, a cloud-assisted network testing system 300 is generally shown in which a plurality of testing devices 302 communicate with a cloud-based server 304, wherein the cloud-based server 304 receives test result data from different testing devices 302 and generates statistics related to the testing devices 302. Additionally, the cloud-based server 304 can authenticate the test result data. Further, the cloud-based server 304 can be used to correlate the test result data to environmental conditions and make predictions based on a presented set of environmental conditions. In addition, the cloud-based server 304 can be used to analyze the test result data to determine efficiency in performance of a job or performance by an operator of testing devices 302.

Figure 3:
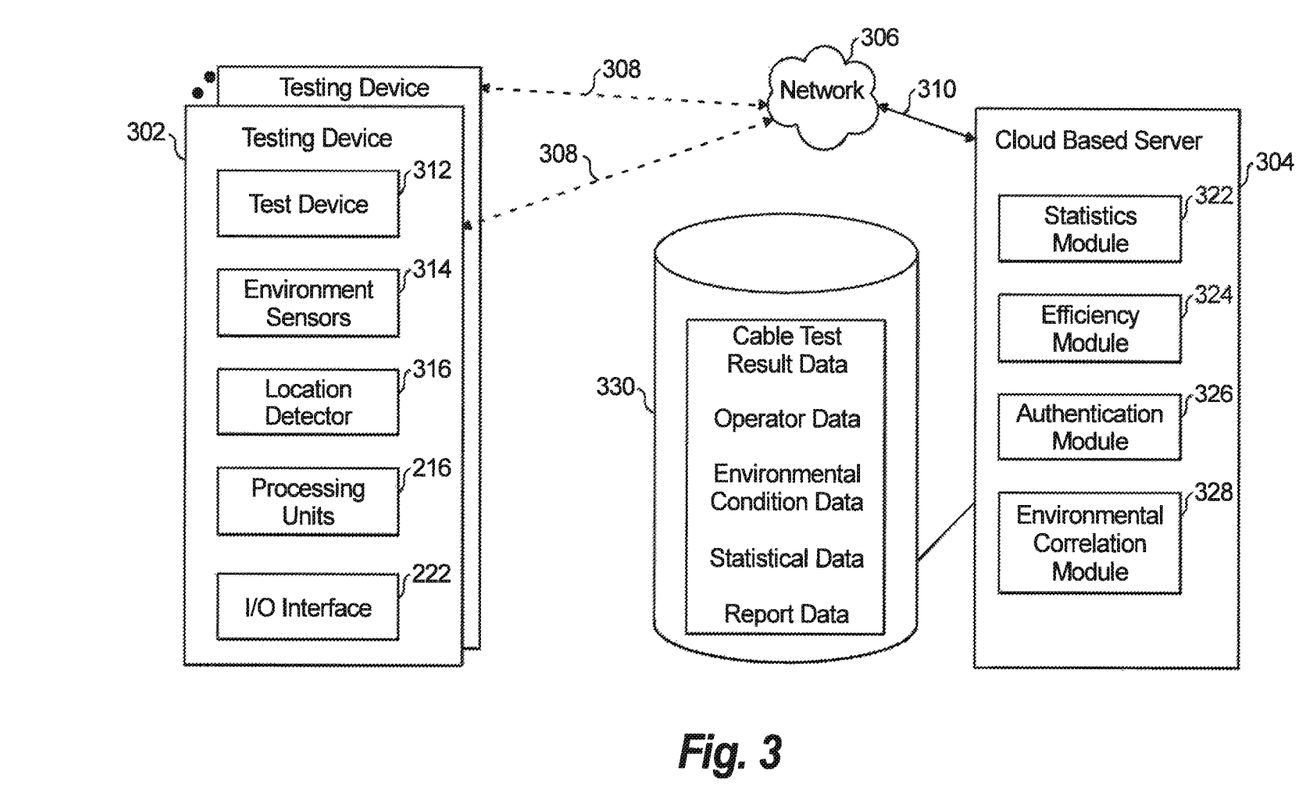
FIG. 3 is a flow diagram that illustrates a cloud-based cable testing system in accordance with the disclosure.

An example testing device 302 is a portable tool that can include a computer system that functions as a node (e.g., nodes 101-105, 107, or 108) of a network 306, wherein network 306 is similar to communication network 100 shown in FIG. 1. Similarly, the server 304 can be a web server that includes a computer system that functions as a node (e.g., node 106) of network 306.

The testing device 302 communicates with the network 306 using a first communication link 308, and the server 304 communicates with the network 306 using a second communication link 310. The first and second communication links 308, 310 can each include a single or multiple wired and/or wireless links. In embodiments, some of these links use near-field communication, such as radio frequency identification (RFID), Bluetooth, infrared communication, or the like. In embodiments, the network 306 includes the Internet. As indicated by the dotted lines, the testing device 302 can be selectively coupled to the network 306 so that the first communication link 308 can be intermittent, e.g., disrupted and reestablished. The second communication link 310 can be stable and readily available during operation times for communicating with the testing device 302. In an embodiment, the testing devices 302 communicate indirectly with the cloud-based server 304 via a communication device (not shown), such as a mobile phone, tablet, or laptop computer.

The testing device 302 and the cloud-based server 304 can each be configured similarly to the network computing device 200 shown in FIG. 2, such as to include a processing unit 216, a network adapter 220, an I/O interface 222, and memory 228.

It is to be understood network testing system 300 may encompass a variety of different types of cabling testing devices 302. Examples include, and are not limited to the flowing Fluke Network® instruments: OptiFiber® Pro OTDR; CertiFiber® Pro Optical Loss Test Set and the DSX-5000 CableAnalyzer™. It is to be further appreciated the illustrated embodiments of the present disclosure encompass tests for network cable including diagnostics, verification, qualification, and certification. With regards to certification testing, and as a non-limiting example, the Versiv™ product from Fluke Network® may be used to facilitate such cable certification.

In operation, the testing device 302 may conduct a cabling test, e.g., for diagnostics, verification, certification, or qualification of copper or fiber cable. Cables to be tested can include low-voltage CAT3, CAT5, CAT5E, CAT6, UTP, STP, SSTP and/or FTP data cables, standard voltage electrical wiring, and/or connectors (e.g., connecting devices) that connect two or more cables that form a portion of a network within a premise (e.g., a home, office, school, and the like). In an example test procedure, one or more ports of the testing device's I/O interface 222 are coupled to at least one of a patch panel port of a patch panel in a data closet via patch cables for exchanging test signals and responses to test signals. Test procedures can include, for example, a cable integrity test or a network connectivity test associated with one or more networked devices (e.g., routers, switches, end-devices, etc.).

The testing device 302 is a portable device that can further include a test device 312, environment sensors 314, and/or a location detector 316. The test device 312 includes one or more sensors to measure electrical characteristics of a signal or power source. The environment sensors 314 include one or more sensors to measure a characteristic of a physical entity, such as temperature, humidity, an exerted force, etc. Environment sensors 314 can further detect electromagnetic interference (e.g., radio frequency interference), such as to determine proximity to devices that emit electromagnetic energy. The test device 312 and environment sensors 314 can include an analog-to-digital (A/D) converter to convert the output signals into digital data. The output from the test device 312 and environment sensors 314 can be time-stamped.

The location detector 316 senses a location of the testing device 302. The location detector 316 can include a Global Positioning System (GPS) sensor. In embodiments, the location detector 316 can include sensors that detect a characteristic, such as an optical code or RFID code, associated with a fixed device having a known location.

Additionally, in embodiments, the location detector 316 can include a device that is external from the testing device 302, and/or included in the cloud-based server 304. In an embodiment, the location detector 316 can be associated with a fixed device having a known location. The location detector 316 associated with the fixed device can sense the presence of the testing device 302, e.g., using optical sensing, RFID, Bluetooth, etc. In another embodiment, the location detector 316 included in the testing device 302 can detect the fixed device and use the location of the fixed device. In either of these scenarios, the location of fixed device can be used to determine the location of the testing device 302. Further, in embodiments, the location detector 316 can include logic to infer location of the testing device 302 from network signals such as IP address, RFID, WIFI, and Bluetooth MAC addresses, and/or a GSM/CDMA cell ID associated with the testing device 302. The location detector 316 outputs time-stamped location data indicative of a location of the testing device 302. The location data can include geolocation data and/or a position of the testing device 302 inside a building, such as relative to a floor map.

The test device 312, environment sensors 314, and location detector 316 can include hardware and software modules (e.g., program modules 215 stored by memory 228 of the server 304).

The testing device's I/O interface 222 can include one or more cable ports (e.g., an Ethernet port, data cable jacks such as RJ 45 jacks, wire clamps, optical ports, and the like), that interface with a cable, such as a patch cord. Test signals and responses can be transmitted and received via the cable ports.

The testing device's processing unit 216 is configured to select test signals to transmit via the cable ports (e.g., pings). The processing unit 216 can further process signals received in response to transmission of the test signals via the ports. The processing unit 216 can process output received from the test device 312 and the environment sensors 314, perform one or more circuit and/or network connectivity diagnostic tests, and generates corresponding test result data.

The test result data can include metadata and data that provides information about the test procedure and the test result data.

For example, the test result data can indicate which type of entity was read or measured (e.g., voltage, current, time (e.g., time interval from ping transmit till ping receive), IP address, bit rate, packet capture rate, and the like) and a value that was read or measured. The value that was measured can be an electrical property (e.g., voltage or current) detected on a cable, time, IP addresses, bit rate, packet capture rate, or other measurements that indicate network device performance and/or network connectivity performance, and the like. The processing unit 216 can use utilities, such as Network Scans, Network Mapping, DNS resolution, DHCP, PING, TraceRoute, IPerf IPv4, and IPv6, etc., and the like, to generate the test result data.

Examples of information that the test result data and associated metadata can further provide include: information about a time that the testing procedure was begun and finished; identification of one or more operators operating the testing device 302; identification of the testing device 302; identification of a patch cord coupled to the testing device 302; identification of the cable under test; location data indicating a geographic location at the time of the testing procedure; environmental conditions at the time of the testing procedure; identification of the testing procedure being performed and/or a job that the testing procedure belongs to.

A job can be, for example, an installation job, in which a network or a portion of a network is installed at a particular location. In another example, a job can be a diagnostic job to identify and correct a problem. In another example, without limitation to the examples listed, a job can be a maintenance job to determine or measure performance of a network.

Identification of the testing device 302, cable under test, and/or patch cord used can be used to determine additional information, such as the make, model, manufacturer, owner, etc. of the testing device 302. The identification of the testing procedure and associated job can be used to determine additional information, such as for which customer the testing procedure or associated job is being performed as a service; which customer uses the cable under test for data communication, an associated monetary value (cost or billable value) for the testing procedure; and/or a geographic location, time, cable, patch cord, operator, duration, etc. that is assigned in connection with the testing procedure or job.

The testing device 302 can include a display device 224 or provide displayable test result data to a remote device, such as a mobile device (e.g., device 105). External devices 214 coupled to the testing device 302 can include a user input device (e.g., a keyboard, touchscreen (e.g., display device 224), and/or biometric sensor) via which an operator can enter user identification information (user ID). Entry of the user ID can be time stamped, and can be used to authorize use of the testing device 302 by the user. The input device can be used to send user input or requests to the cloud-based server 304. For example, if a user notices an anomaly in operation of a network cable, the user can send an alert to the cloud-based server 304 so that the cloud-based server can investigate if there is a correlation between the anomaly and environmental conditions indicated by output from the environment sensors 314.

During a test procedure, the testing device 302 can generate one or more test signals, transmit the test signals for testing a cable, receive response test signals, process the response test signals, and transmit results to the cloud-based server 304 for analysis thereof. Processing the response test signals can include verifying whether or not a cable is receiving and transmitting data as intended (e.g., that the cable is connected properly, that the component wires of the cable have been terminated correctly without being crossed, all wires in the cable are transmitting data, etc.). When data is obtained from a test, it may be stored in the testing device 302 and/or transmitted to the cloud-based server 304. Further, data may be aggregated for comparison with data from other testing devices 302 or cloud-based servers 304.

The cloud-based server 304 receives the test result data from the plurality of testing devices 302. It is to be appreciated the cloud-based server 106 may implement the Link-Ware™ Live product from Fluke Network® to store and manage test result data received from remote testing devices 302.

The cloud-based server 304 includes a statistics module 322, an efficiency module 324, an authentication module 326, and an environmental correlation module 328, each of which can include software modules (e.g., program modules 215 stored by memory 228 of the server 304). The cloud-based server 304 includes or is coupled to a database 330 that stores information for a plurality of testing devices that can couple to the cloud-based server 304 via network 306. Information stored by the database 330 can include, for example, cable test result data, operator data, environmental condition data, statistic data, and/or report data.

A user computing device (e.g., node smartphone device 105, a client computing device 103, or the testing device 302) may access a cloud-based service provided by the cloud-based server 304 to request and/or receive information output by the cloud-based server 304. In an example embodiment, access to the cloud-based service can be provided by web-browser software resident on the user computing device running applications (e.g., Java applets or other applications), which may include application programming interfaces ("API's") to more sophisticated applications running on remote servers.

In an example embodiment, a user operating the user computing device can log on to the cloud-based services using the web-browser software. In an example, the user can request, for example, comparison of test result data associated with a designated testing device 302, operator, and/or job be compared to a corresponding statistic. In another example, the user can request authentication of test result data associated with a designated testing device 302, operator, and/or job. In a further example, the user can request information regarding warnings associated with particular environmental conditions.

With reference now to FIGS. 4-7, shown are flowcharts demonstrating implementation of the various exemplary embodiments. It is noted that the order of operations shown in FIGS. 4-7 is not required, so in principle, the various operations may be performed out of the illustrated order. Also certain operations may be skipped, different operations may be added or substituted, or selected operations or groups of operations may be performed in a separate application following the embodiments described herein.

Figure 4:
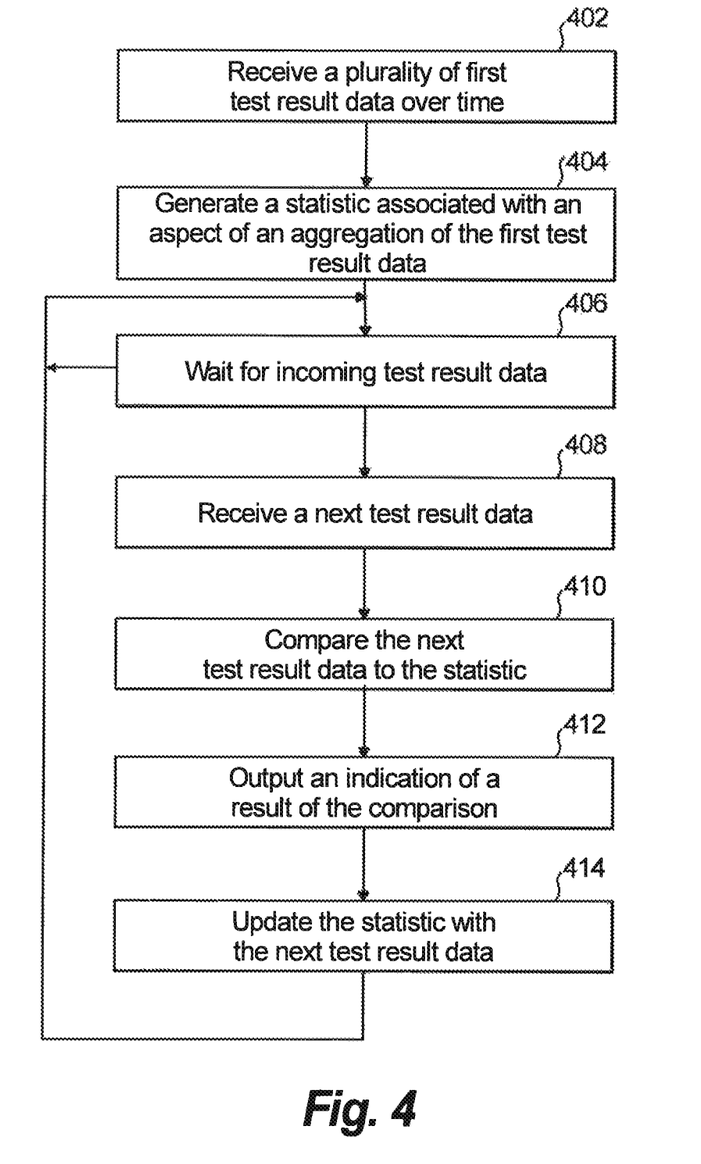
FIG. 4 is a flowchart illustrating a method performed by a cloud-based server to generate a statistic based on received test result data and compare received test result data to the statistic in accordance with the disclosure.

FIG. 4 shows a flowchart of operations performed in accordance with a method of the disclosure performed by the statistic module 322 when generating statistics and detecting patterns based on an aggregation of received test result data, or comparing received test result data to a statistic or detected patterns.

At operation 402, a plurality of first test result data is received over time in association with testing first cables. This plurality of first test result data are results from multiple testing procedures accumulated over time by multiple testing devices 302. Each instance of first test result data can include metadata and data that provides information about the test procedure and the test result data.

At operation 404, an analysis is performed on an aggregation of received test result data. The aggregation of received test result data herein refers to the first test result data, which includes the previously received data from previous iterations of operation 402. The analysis can include generating statistics for an aspect of the aggregation of received test result data. The analysis can further include comparing differences associated with an aspect of the first test result data. For example, each possible pair combinations of the first test result data can be examined to determine the difference between members of the respective pairs. The analysis can further include detecting a pattern (or patterns) in the determined differences.

The aspects can be included in or determined from information provided by the test result data. Examples of aspects include, but are not, limited to, time spent testing a cable, number of times that a cable was tested in order to pass a particular specification, time interval between successive tests, number of operators used to perform the testing procedure, number of operators used to perform the job, an amount of cable (e.g., measured by length or number of connectors) that was tested by the testing procedure, time spent by a particular operator to perform the testing procedure, measurement values associated with a particular operator, location of testing procedures performed by a particular operator, and the like.

The statistic can include, for example, an average value, a mean value, a difference between values, a maximum value, a minimum value, or a number of times that a specified condition (e.g., an operator performing testing procedures that produced the same test result values or that were performed at the same location or upon the same cable) occurred.

Examples of statistics associated with an aspect of the plurality of first test result data results that can be generated include, without limitation:

Average, maximum, or minimum time spent testing a cable under test;

Average, maximum, or minimum number of times that a cable was tested until it passed a particular specification;

Average, maximum, or minimum time between successive testing procedures included in a particular type or size of job or performed by a particular operator;

Average number of operators used to perform a particular test procedure or type or size of job;

Average amount of cable installed for a particular type of job for installing network cable; and Total amount of a particular type of cable installed in connection with a particular type of job for installing cable.

The statistic can be used as benchmarks that can be used for comparing to other testing procedures or jobs. In a further embodiment, the statistic can include:

Number of repetitions by an operator of the same measurement values; and

Number of repetitions by an operator of the same cable or at the same geographic location.

At operation 406, a wait step is performed to wait for incoming test result data, after which the method continues at operation 408. At operation 408, next test result data that is allegedly new relative to the first test result data is received. The next test result data are new relative to the first test result data, for example, due to being associated with different testing procedures, different jobs, performed on different cables, performed at different locations, etc., than the first test result data. Tests that were merely allegedly performed at different times and/or by different operators, depending on the circumstances, may not actually be different tests, but could indicate that first test data is being copied and presented as new test data.

At operation 410, the next test result data is compared to the aggregation of the first test result data, including the statistics and/or patterns determined for the first test result data, the previously determined differences between members of respective possible pair combinations of the first test result data. Differences are determined between the next test result and the first test result data, including for respective possible pair combinations of the next test result and the first test result data. The differences determined at operation 410 can be compared to differences determined at operation 404, such as to determine if there is a significant disparity associated with the next test result data relative to the first test result data. Such a significant disparity could indicate that the next test result data corresponds to a unique test procedure (e.g., being associated with different jobs, performed on different cables, and/or performed at different locations), and not copied from the first test result data or generated by testing the same cable as any the first test result data.

An analysis can be performed to detect if the next test result data fits in with a previously detected pattern or helps to establish a new pattern. It is possible that testing a particular group of cables exhibit similar test result data relative to one another, particularly if they came from the same cable spool. Using an aggregation of the first test result data to detect patterns can help to determine whether the next test result data is was generated from testing unique cables relative to previously tested cables associated with the first test result data.

At operation 412, an indication is output of a result of the comparison. For example, the indication can indicate that the next test result surpasses or does not meet a benchmark set by the analysis of the aggregation of first test result data.

At operation 414, the analysis results are updated using the next test result data, e.g., by recalculating the statistic using the next test result data and updating patterns of differences between test data, including the first test result data and the next test result data, that have been detected. In this fashion, the statistic is kept updated as new test result data is received, and newly received test result data can be compared to the most recently updated benchmark statistic. The method continues at operation 406. Operations 406-414 can be repeated each time that new test result data is received in real-time, near real-time or at a later time.

The efficiency module 324 can use the statistics to analyze the efficiency of an operator or other factors related to the testing procedures. Other factors can include, for example, the manufacturer, make, or model of the testing device 302. For example, a value that indicates performance of an operator relative to a related statistic can be used to measure the operator's efficiency. Performance can include factors such as time to perform a testing procedure, time between performance of test procedures, number of testing procedures performed until a specification is satisfied, etc.

Figure 5:
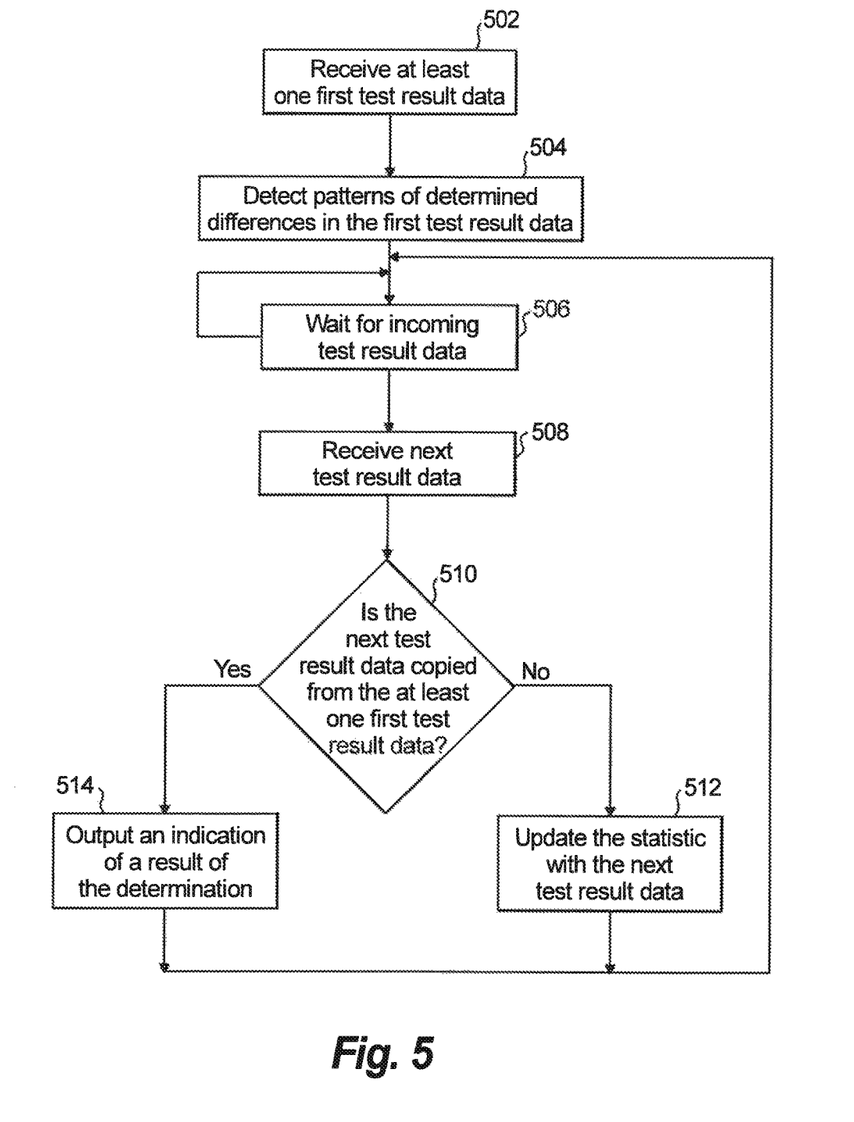
FIG. 5 is a flowchart illustrating a method performed by the cloud-based server to authenticate received test result data in accordance with the disclosure.

FIG. 5 shows a flowchart of operations performed in accordance with a method of the disclosure performed by the authentication module 326 when determining if received test result data is authentic. At operation 502, similar to operation 402, at least one first test result data is received over time. At operation 504, similar to operation 404, an analysis is performed on the first test result data to compare all combinations of the first test result data to detect differences between any pairs of first test result data, to detect patterns in the detected differences, wherein the patterns can be associated one or more aspects (e.g., time spent or number of repetitions testing a cable, time interval between successive tests, number of operators used to perform the testing procedure, number of operators used to perform the job, an amount of cable (e.g., measured by length or number of connectors) that was tested by the testing procedure, time spent by a particular operator to perform the testing procedure, measurement values associated with a particular operator, location of testing procedures performed by a particular operator, and the like) of the plurality of first test result data.

At operation 506, similar to operation 406, a wait step is performed to wait for incoming test result data, after which the method continues at operation 508. At operation 508, similar to operation 408, next test result data that is new relative to the first test result data is received. At operation 510, a determination is made by comparing the next test result data to the first test result data and the determined patterns to determine if the next test result data indicates a suspicious activity. The suspicious activity can indicate that an operator is performing a testing procedure on a cable under a guise that the testing procedure is being performed on a different cable, that the test result data is not authentic, and/or that a test report does not include authentic test result data. A test report can be determined to include inauthentic data if the test result data included in the test report does not correlate properly (miscorrelates) with the test result data output by the testing device 302 that was used.

A suspicious activity can include when the next test result data is copied from the first test result data. This determination can include, for example, determining whether the same measurement values were received beyond a threshold number of times or under suspicious conditions. Suspicious conditions can be determined to be, for example, at different times, at different geographic locations, in connection with different jobs, in connection with measuring different cables, in connection with detection that the measurements in the next test result data are identical to results included in the first test result. Another suspicious activity can include when the next test result data is obtained by repeating a test and passing it off as a result for a different cable or location. This determination can include, for example, determining whether testing procedures were performed multiple times at the same geographic location at different times, or in accordance with detected patterns of insignificant differences between groups of test result data within the entire set of test result data. The next test result data can still be deemed suspicious even when a different patch cord is used to perform the testing procedure relative to the first test result data, as an operator can easily switch a patch cord and repeat a testing procedure on the same cable to try and pass off the repeated testing procedure as a new testing procedure.

If the determination at operation 510 is NO, then at operation 512, the next test result data is added to the first test result data. The method continues at operation 506 in which a wait step is performed to wait for incoming test result data, after which the method continues at operation 508. If the determination at operation 510 is YES, then at operation 514 an indication is output to indicate a result of the determination, namely that the next test result data indicates suspicious activity. The method continues at operation 506.

Figure 6:
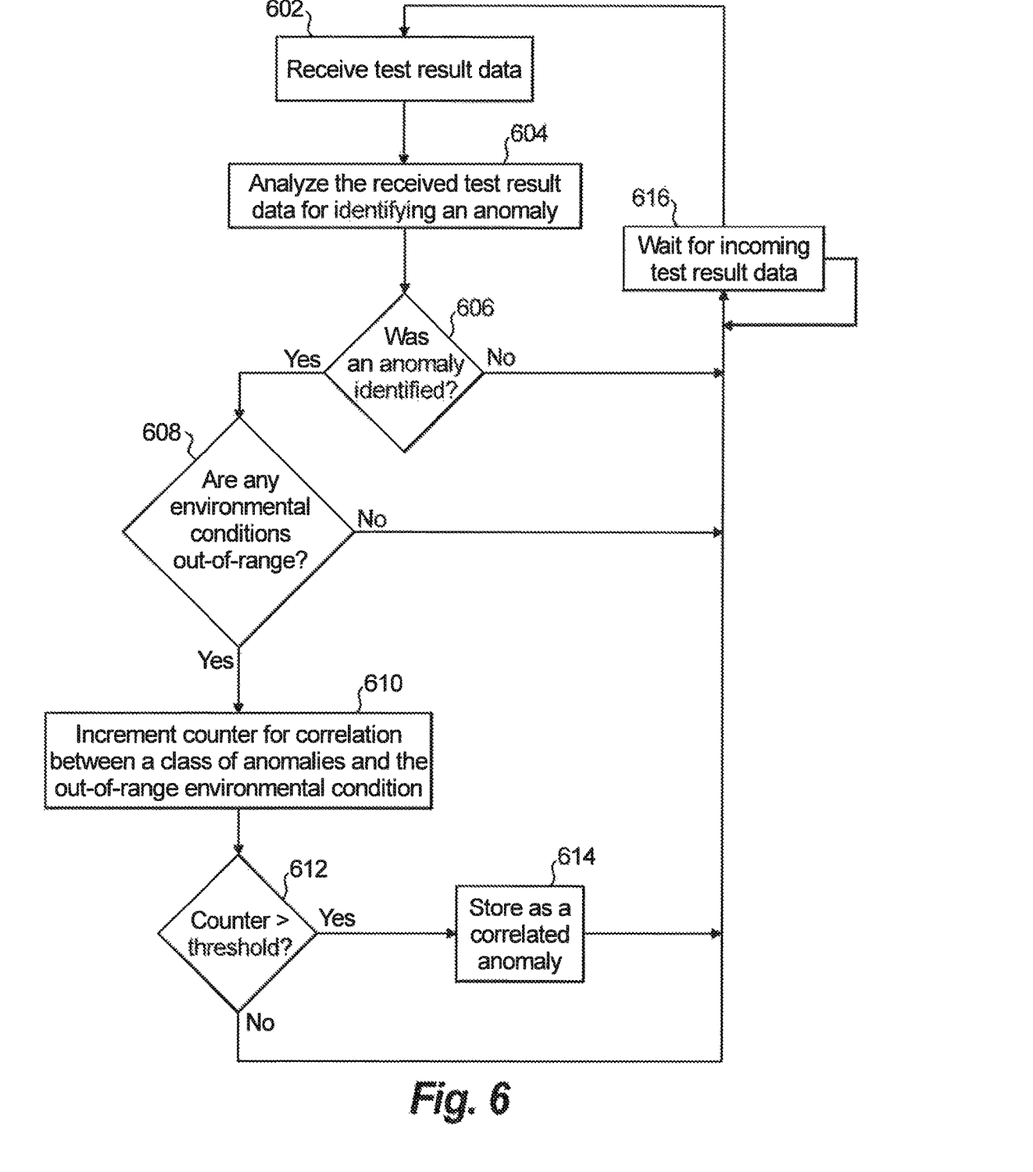
FIG. 6 is a flowchart illustrating a method performed by the cloud-based server to determine if an anomaly associated with received test result data is associated with an environmental condition in accordance with the disclosure.

FIG. 6 shows a flowchart of operations performed in accordance with a method of the disclosure performed by the environmental correlation module 328 when determining if an anomaly associated with received test result data is associated with an environmental condition. At operation 602, similar to operation 402, test result data is received. At operation 604, the test result data is analyzed for identifying an anomaly. An anomaly can include a failure of a diagnostic, verification, certification, or qualification test, or a report of failed communication associated with a cable. The analysis performed at operation 604 can include applying a weighted set of test criteria to a comparison of the test result data and a class of anomalies and out-of-range environmental conditions, and the result of that weighted test criteria will determine that this is a correlated anomaly. At operation 606, a determination is made whether an anomaly was identified at operation 604. If the determination at operation 606 was NO, the method continues at operation 616. At operation 616 a wait step is performed to wait for incoming test result data, after which the method continues at operation 602.

If the operation at operation 606 is YES, then at operation 608 a determination is made whether there is a correlation between the anomaly and associated environmental data. The correlation includes determining if one or more environmental conditions, as indicated by the environmental data, are outside of a predefined normal range. At operation 610, a counter is incremented, wherein the counter is associated with a correlation between the anomaly (or similar anomalies) and the particular environmental condition that is out of the normal range. The breadth of the group of similar anomalies can be selected to encompass all anomalies, a wide breadth of anomalies, or a narrow breadth of anomalies. A different analysis can be performed for each range of anomalies.

At operation 612, a determination is made whether the counter exceeds a predetermined threshold. If the determination at operation 612 is YES, the method continues at operation 614 in which an association between the anomaly and the out-of-range environmental condition are stored as being correlated. The method continues at operation 616 in which a wait step is performed to wait for incoming test result data. The method then continues at operation 602. If the determination at operation 612 is NO, the method continues at operation 616.

Figure 7:
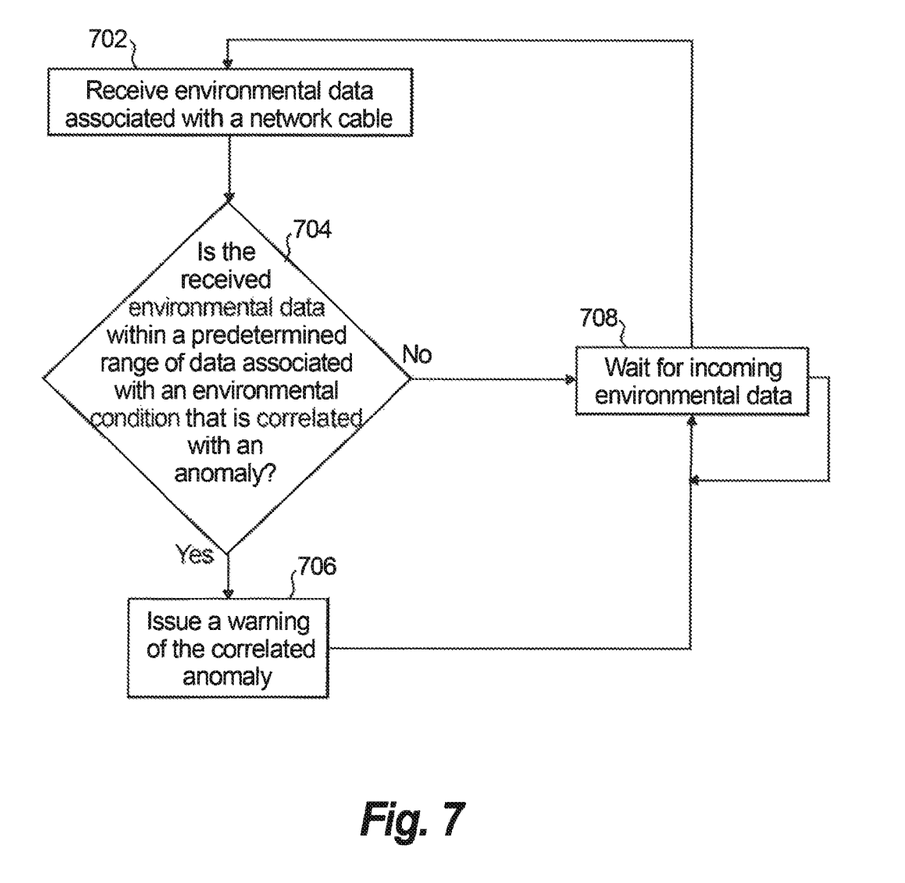
FIG. 7 is a flowchart illustrating a method performed by the cloud-based server to determine whether to issue a warning based on an environmental condition in accordance with the disclosure.

FIG. 7 shows a flowchart of operations performed in accordance with a method of the disclosure performed by the environmental correlation module 328 when determining if a warning should be issued based on an environmental condition. At operation 702, environmental data associated with a network cable is received. At operation 704, a determination is made whether the received environmental data is within a predetermined range of data associated with environmental conditions that have been correlated with an anomaly.

If the determination at operation 704 is YES, the method continues at operation 706 in which a warning is issued (e.g., an indicator is activated to indicate an alert) based on the correlation between the environmental condition and the anomaly. The method continues at operation 708 in which a wait step is performed to wait for incoming environmental data that is associated with test result data. The method then continues at operation 702. If the determination at operation 704 is NO, the method continues at operation 708.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for authenticating test result data, comprising:
a plurality of first testing devices configured to perform testing procedures to test cables of at least one communication network and to output first test result data based thereon; and
a cloud-based server device coupled via a network to the plurality of first testing devices, the server device including:
a database configured to store the first test result data; and
a processor configured to:
determine a statistic based on an aggregation of the first test result data output by the plurality of first testing devices;
receive second test result data from a second testing device configured to perform testing procedures to test cables of the at least one communication network and output the second test result data based thereon;
compare the second test result data to the statistic;
determine an authentication status of the second test result data based on the comparison of the second test result data to the statistic; and
output an indication of a suspicious activity based on the authentication status.

2. The system according to claim 1, wherein the processor is further configured to:
determine a difference between members of respective pairs of the first test result data for possible pair combinations of the first test result data;
detect one or more patterns in the determined differences;
compare the second test result data to the one or more patterns; and
output an indication of a suspicious activity based on the comparison to the one or more patterns.

3. The system according to claim 2, wherein the processor is further configured to update at least one of the statistic and the one or more patterns based on the second test result data.

4. The system according to claim 2, wherein the statistic and difference are related to a time associated with testing procedures performed on at least one of the cables.

5. The system according to claim 2, wherein the statistic and difference are related to a number of times that testing procedures have been performed on one of the cables in order to obtain first test result data that meets a predefined specification.

6. The system according to claim 2, wherein the statistic and difference are related to a number of operators using the plurality of first testing devices to perform at least one of the testing procedures.

7. The system according to claim 2, wherein the statistic and difference are related to a length of cable or an amount of cables tested by at least one of the testing procedures.

8. The system according to claim 2, wherein the processor is further configured to determine the authentication status of the second test result data using the aggregation of the first test result data and the one or more patterns.

9. The system according to claim 1, wherein the determination of the authentication status includes detecting whether the second test result data at least one of: duplicates an instance of the first test result data; is associated with testing of a particular cable multiple times under the guise of testing multiple cables; and results from testing of a particular cable multiple times using different patch cords under the guise of testing multiple cables.

10. The system according to claim 2, wherein the determination of the authentication status includes detecting whether the second test result data miscorrelates with a corresponding testing report using the aggregation of the first test result data and at least one of the statistic and the one or more patterns.

11. The system according to claim 2, wherein the processor is further configured to correlate an environmental condition with an effect on the first test result data using the aggregation of the first test result data and at least one of the statistic and the one or more patterns.

12. The system according to claim 11, wherein the processor is further configured to predict an effect on a cable of a communication network in response to an environmental condition based on the correlation of the environmental condition with the first test result data.

13. The system according to claim 11, wherein the environmental condition is selected from at least one of temperature, humidity, and electromagnetic interference.

14. The system according to claim 2, wherein the processor is further configured to measure performance of an operator of the second testing device using the aggregation of the first test result data and at least one of the statistic and the one or more patterns.

15. The system according to claim 1, wherein the plurality of first testing devices are selected from a collection of first testing devices based on at least one of a characteristic of the cables, one or more customers using the cables for data communication, and identification of an operator that operated the plurality of first testing devices.

16. A cloud-based computer server comprising:
a memory configured to store executable instructions;
a processor disposed in communication with the memory, wherein upon execution of the instructions the processor is configured to:
receive first test result data output by a plurality of first testing devices and associated with testing procedures performed by the plurality of first testing devices to test cables of at least one communication network;
determine a statistic based on an aggregation of the first test result data output by the plurality of first testing devices;
receive second test result data from a second testing device;
compare the second test result data to the statistic;
determine an authentication status of the second test result data based on the comparison of the second test result data to the statistic; and
output an indication of a suspicious activity based on the authentication status.

17. The cloud-based computer server according to claim 16, wherein the processor is further configured to:
determine a difference between members of respective pairs of the first test result data for possible pair combinations of the first test result data;
detect one or more patterns in the determined differences;
compare the second test result data to the one or more patterns; and
output an indication of a suspicious activity based on the comparison to the one or more patterns.

18. The cloud-based computer server according to claim 17, wherein the processor is further configured to determine the authentication status of the second test result data using the aggregation of the first test result data and the one or more patterns.

19. A method of authenticating test result data, comprising:
determining a statistic based on an aggregation of first test result data output by a plurality of first testing devices configured to perform testing procedures to test cables of at least one communication network and output the first test result data based thereon;
receiving second test result data from a second testing device configured to perform testing procedures to test cables of the at least one communication network and output the second test result data based thereon;
comparing the second test result data to the statistic;
determining an authentication status of the second test result data based on the comparison of the second test result data to the statistic; and
outputting an indication of a suspicious activity based on the authentication status.

20. The method of claim 19, further comprising:
determining a difference between members of respective pairs of the first test result data for possible pair combinations of the first test result data;
detecting one or more patterns in the determined differences;
comparing the second test result data to the one or more patterns; and
outputting an indication of a suspicious activity based on the comparison to the one or more patterns.

21. The method of claim 20, further comprising determining the authentication status of the second test result data using the aggregation of the first test result data and the one or more patterns.

* * * * *